United States Patent [19]
Kopsco

[11] Patent Number: 4,919,489
[45] Date of Patent: Apr. 24, 1990

[54] COG-AUGMENTED WHEEL FOR OBSTACLE NEGOTIATION

[75] Inventor: M. Alan Kopsco, Wantagh, N.Y.

[73] Assignee: Grumman Aerospace Corporation, Bethpage, N.Y.

[21] Appl. No.: 183,953

[22] Filed: Apr. 20, 1988

[51] Int. Cl.[5] .......................................... B60B 15/26
[52] U.S. Cl. ............................ 301/44 T; 152/158;
152/313; 152/516; 152/520; 180/9.1; 180/10;
280/5.2; 301/5 R; 301/41 R; 301/44 R
[58] Field of Search ............. 180/8.2, 8.7, 9.1, 9,
180/7.1, 10, 65.6; 280/5.2, 5.22, 5.26, 5.28;
305/5, 6, 7, 1, 11; 301/1, 5 R, 7, 41 R, 44 R, 44
T, 47, 48, 95; 152/418, 416, 331.1, 155, 157,
158, 519

[56] References Cited

U.S. PATENT DOCUMENTS

| | | | |
|---|---|---|---|
| 235,167 | 12/1880 | Nelson | 305/5 |
| 255,693 | 3/1882 | Tauber | 280/5.26 |
| 612,583 | 10/1898 | Davidson | 152/158 |
| 1,106,182 | 8/1914 | Beard | 305/6 |
| 1,316,951 | 9/1919 | Henderson | 305/7 |
| 2,171,805 | 9/1939 | Picard | 152/157 |
| 2,400,824 | 6/1944 | Jackson | 180/8.2 |
| 2,424,799 | 7/1947 | Colombo | 301/41 R |
| 2,633,363 | 3/1953 | Marshall | 280/5.26 |
| 3,095,917 | 7/1963 | Arsandaux | 152/155 |
| 3,178,193 | 4/1965 | Grogan | 280/5.26 |
| 3,179,431 | 4/1965 | Pikl | 280/5.2 |
| 3,206,253 | 9/1965 | Bedan et al. | 301/44 R |
| 3,226,128 | 12/1965 | Grier, Jr. | 280/5.2 |
| 3,226,129 | 12/1965 | McKinley | 280/5.2 |
| 3,304,094 | 2/1967 | Wenger | 280/5.2 |
| 3,499,501 | 3/1970 | Fitzgerald et al. | 180/8.2 |
| 3,713,706 | 1/1973 | Trudeau | 305/7 |
| 3,913,982 | 10/1975 | Brewer | 301/45 |
| 4,061,199 | 12/1977 | Last | 180/8.2 |
| 4,108,449 | 8/1978 | Rhodes | 280/5.28 |
| 4,154,315 | 5/1979 | Rasmussen | 180/8.2 |
| 4,246,947 | 1/1981 | Ewing | 152/158 X |
| 4,289,187 | 9/1981 | Rivin | 152/331.1 X |

FOREIGN PATENT DOCUMENTS

| | | | |
|---|---|---|---|
| 214579 | 9/1956 | Australia | 301/41 R |
| 2808496 | 8/1979 | Fed. Rep. of Germany | 152/158 |
| 1179623 | 12/1958 | France | 280/5.26 |
| 574648 | 3/1958 | Italy | 280/DIG. 10 |
| 259507 | 12/1985 | Japan | 301/41 R |
| 85146 | 5/1920 | Switzerland | 305/5 |
| 134173 | 10/1919 | United Kingdom | 280/5.26 |

Primary Examiner—Mitchell J. Hill
Attorney, Agent, or Firm—Pollock, Vande Sande & Priddy

[57] ABSTRACT

A vehicle for overcoming obstacles includes a wheel having an elastomeric flexible annulus upon which the wheel normally rides. Parallel spaced sprockets receive the annulus and include individual cogs which extend less radially outwardly than the annulus. When an obstacle is encountered, the flexible annulus yields, thereby enabling a protruding cog to engage the obstacle and pivot around it thereby lifting the vehicle over the obstacle.

3 Claims, 3 Drawing Sheets

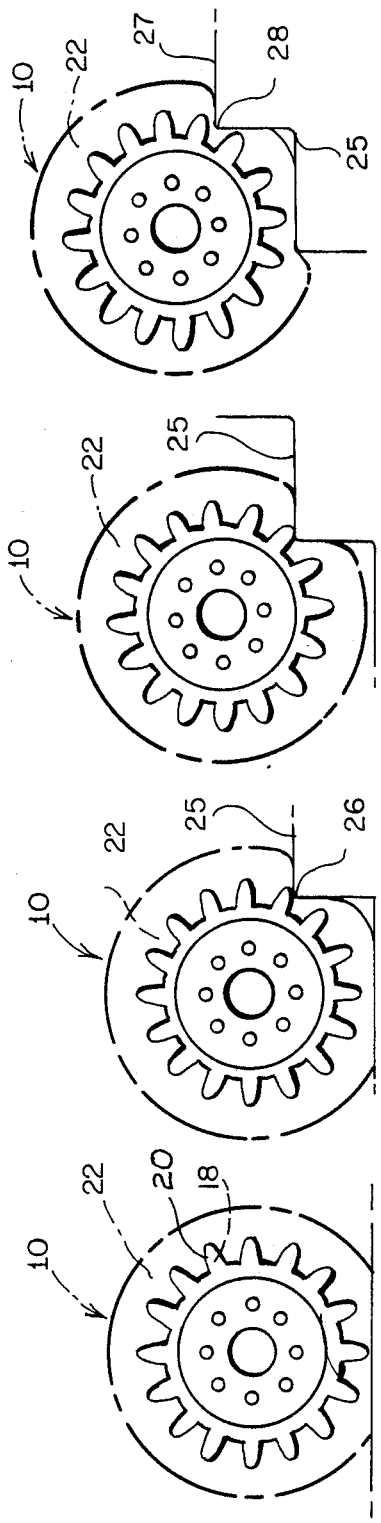

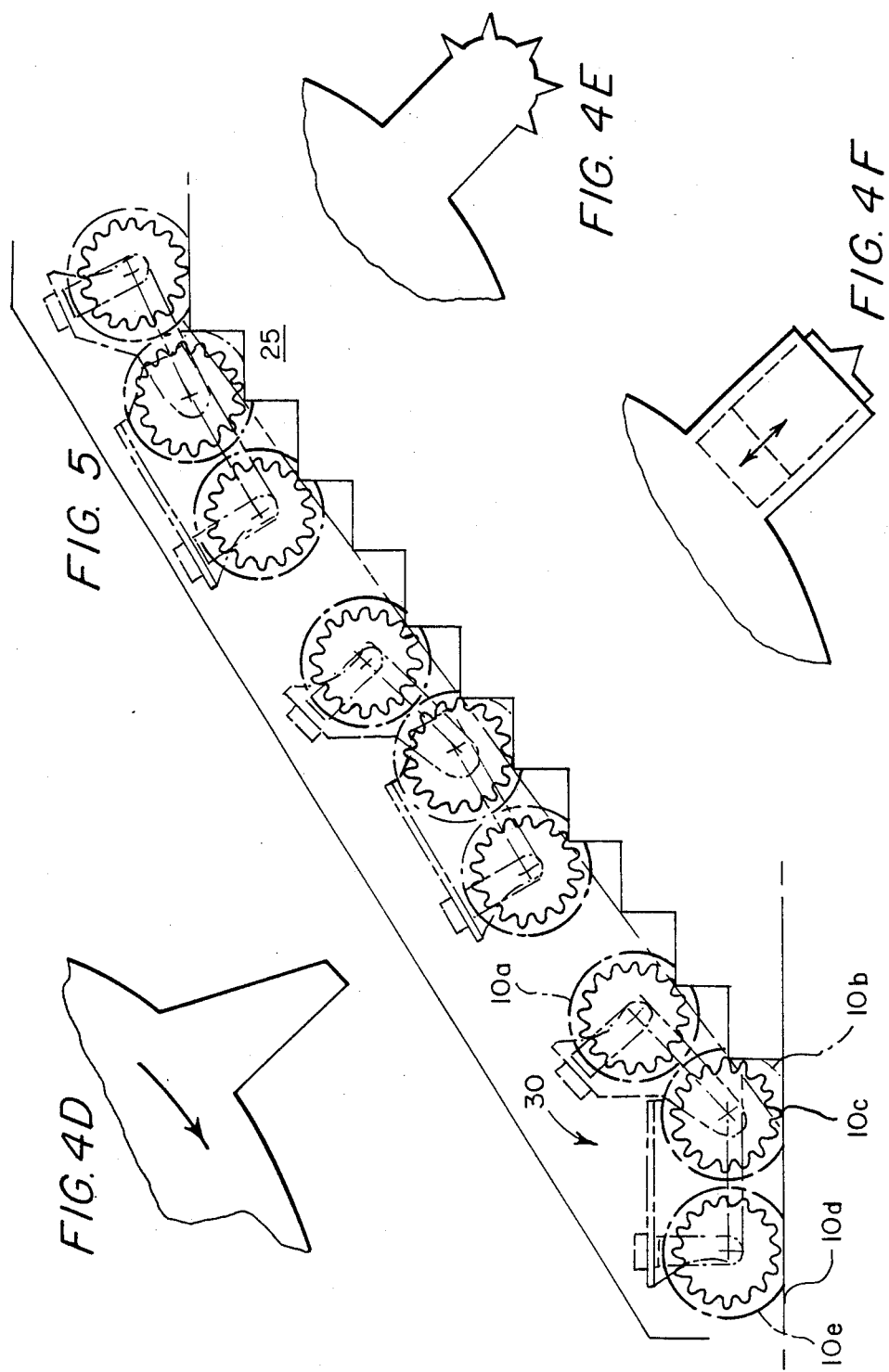

COG-AUGMENTED WHEEL FOR OBSTACLE NEGOTIATION

FIELD OF THE INVENTION

This invention relates to a wheeled vehicle which can climb stairs and/or traverse level or sloping terrain characterized by projecting obstacles.

BRIEF DESCRIPTION OF THE PRIOR ART

In certain emergency situations where a utility vehicle is required to climb a stairway, the traditional approach has been to use a tracked vehicle which bridges the steps. However, tracks have fundamental drawbacks such as imprecise skid steering, complexity, and high energy requirements. For other than very heavy vehicles, which require tracks for proper ground load distribution, wheeled vehicles are superior in terms of steering, energy use, and simplicity. Although some wheeled vehicles have demonstrated stair climbing by the use of large grouser cleats or other aggressive tread elements, their behavior is often erratic. If precise control is required, as for example in a vehicle carrying a video camera and steered remotely for precise observation of a remote site, vehicle steadiness during stair climbing and other maneuvers is vital.

An analysis of the problem begins with the fact that a vehicle climbing a 40° slope and relying on friction alone would have to achieve an average coefficient of friction between the slope and its propulsion ground contact surfaces of at least 0.839. While this coefficient can be achieved under test conditions, it cannot by any means be assured under field conditions. For example, rubber on grass or wet grass, such as is found in embankments, rubber on wet steel, oily material on most surfaces, and of course ice, will all produce friction coefficients that are low and widely variable (0.02 to 0.4). What is even more insidious is the fact that different contact surfaces of the vehicle will experience greatly different coefficients under realistic field conditions, which can produce severe turning moments and the potential for disastrous loss of control.

If a significant coefficient of friction cannot be relied upon to ascend or descend steep slopes or steps, then reliance must be placed on cleats or cogs that engage, bite into, or create irregularities in the surface that will propel the vehicle upward or allow it to descend under control. The configuration that makes the most effective, reliable use of such devices will have an advantage in terms of ability to negotiate difficult surface slope situations.

Intuitively, it would appear that a conventional tracked vehicle approach would be most effective in presenting a cleated surface to the supporting surface, particularly in a stair climbing situation. This has been proven, both analytically and experimentally, to be incorrect.

Except for the fortuitous situation where the pitch of the cleats and the pitch of stairs are an exact integer relationship, only a limited number of cleats will rest on the horizontal surface of the stair tread. Only the cleats that engage the stairs in this way will counter the gravity vector without producing a sliding force. All other contacts between the track and the stair edge produce undesirable sliding components that may or may not be adequately resisted by friction effects. What is more significant, all cleats bear a fixed relationship to each other so that when the pitch of the cleats and the stairs are related by exact integers and when a cleat reaches the end sprocket, the entire track may slide until a new cleat finds a horizontal surface.

BRIEF DESCRIPTION OF THE PRESENT INVENTION

The present invention combines positive stair climbing capability with the advantages of a wheeled vehicle. Each driven wheel is a system consisting of a basic wheel of a compressible elastomeric foam, covered (on the ground contact surface only) by a thin tread, plus two side plates, scalloped on their outer peripheries to create a series of cogs. These side plates are not attached to the foam, but do constrain it from moving laterally. The entire system is completely passive, without links, cranks, pawls, or other moving parts.

The foam is compressed radially when loaded and the compressed area is localized, i.e., deformations are not propagated very far into other parts of the wheel. This means that the deformed thin tread matches closely the irregularities of an encountered obstacle. In the case of steps, the cogs of the wheel envelop stair edges and cause lifting of a supported vehicle.

Because the wheels are independently driven, each will rotate until its next-approaching cog engages the upcoming step or other projecting obstacle. Thus, a wide range of step proportions or other repetitive obstacle spacings can be accommodated, in contrast to a track that has a fixed spacing between gripping elements.

BRIEF DESCRIPTION OF THE FIGURES

The above-mentioned objects and advantages of the present invention will be more clearly understood when considered in conjunction with the accompanying drawings, in which:

FIGS. 3A–3D illustrate a stair climbing sequence for the wheel illustrated in FIGS. 1 and 2;

FIG. 4A is a partial elevational view of the invention wherein the cogs thereof may be characterized by a rounded tip, triangular configuration;

FIG. 4B is a partial elevational view of the invention wherein the cogs thereof may be characterized by a square-ended and parallel-sided configuration;

FIG. 4C is a partial elevational view of the invention wherein the cogs thereof may be characterized by a round-ended and parallel-sided configuration;

FIG. 4D is a partial elevational view of the invention wherein the cogs thereof may be characterized by a sloped top side configuration;

FIG. 4E is a partial elevational view of the invention wherein the cogs thereof may be characterized by a fixed spur configuration;

FIG. 4F is a partial elevational view of the invention wherein the cogs thereof may be characterized by a retractable spike configuration; and FIG. 5 is a schematic illustration of a vehicle equipped with the wheels of the present invention showing a sequence of step climbing positions.

DETAILED DESCRIPTION OF THE INVENTION

Figure 2:
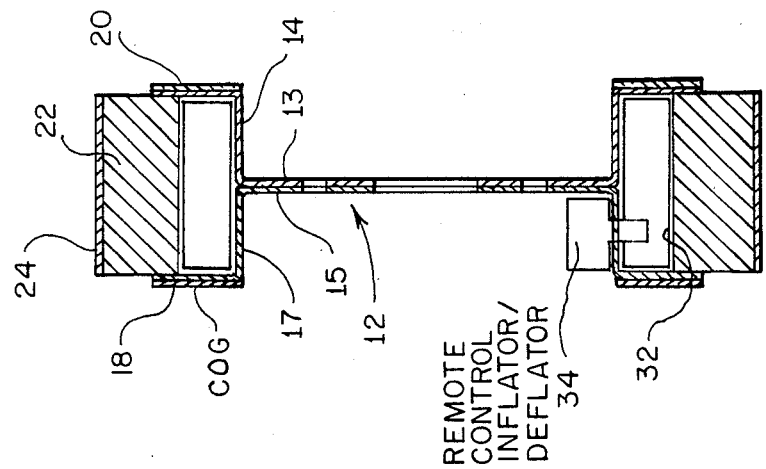
FIG. 2 is a cross-sectional view taken along a plane passing through section line 2—2 of FIG. 1.
Figure 1:
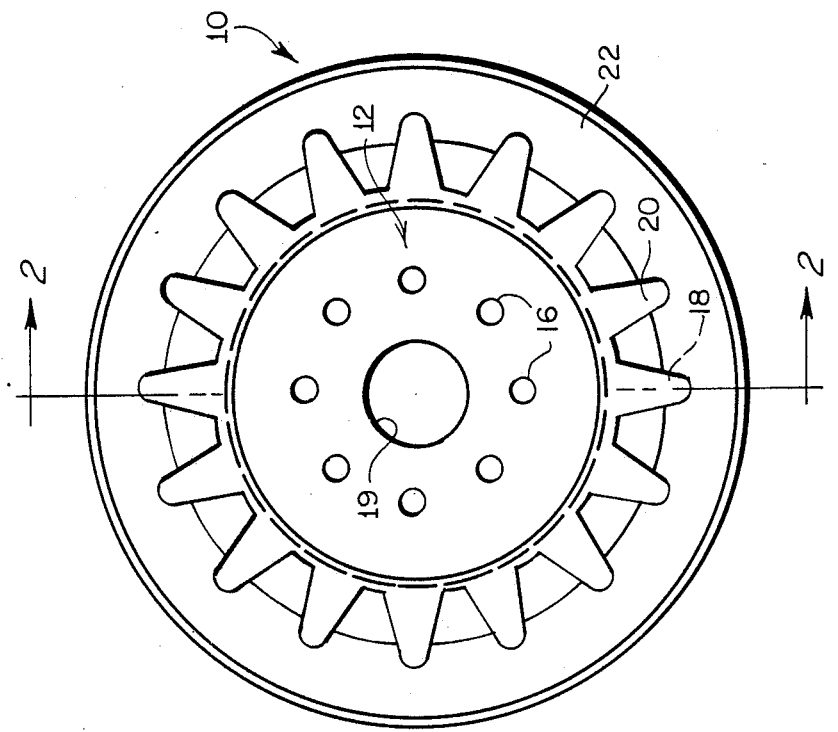
FIG. 1 is a side elevational view of a wheel constructed in accordance with the present invention.

FIG. 1 is an elevational view of a wheel 10 which forms the heart of the present invention. The wheel includes a central hub 12 which, as seen in FIG. 2, may be comprised of two juxtaposed central circular plates 13 and 15 extending perpendicularly to respective transverse opposing cylindrical sections 14 and 17, which themselves articulate to parallel spaced sprocket sections 18 and 20. The sections 14, 17, 18 and 20 form an annular recess into which an elastomeric annulus 22 may be inserted and secured by adhesive or fasteners. FIG. 1 indicates that the sprocket sections 18 and 20 have a cog-like profile. In a preferred embodiment of the present invention, the annulus is fabricated from a closed-cell foam material The outward road-engaging surface of the annulus is covered with an abrasive-resistant tread layer 24 of suitable material.

A central opening 19 is formed in the hub 12 for receiving a drive shaft. The individual openings 16 allow the circular plates 13 and 15 to be bolted together. Of course, other fasteners or welding may be employed. When the wheel construction is completed, the cogs 18 and 20 are transversely aligned.

FIGS. 3A–3D illustrate a stair climbing sequence for the wheel thus described In FIG. 3A, the foam annulus 22 is indicated as being normally deformed on a level surface. The parameters of the wheel materials and dimensions are chosen so that in this normal condition the cogs 20 and 18 remain clear of the ground.

In FIG. 3B, the wheel is schematically illustrated as having advanced to a first step 25. As illustrated, the wheel will turn until it has advanced sufficiently to cause engagement between a cog and the edge 26 of the first step. As the wheel continues to turn, there is sufficient torque to lift the wheel as the wheel pivots on the engaged cog, this being illustrated in FIG. 3C.

Continuing rotation of the wheel completes the negotiation of the first step followed by an approach of the wheel to a second step 27. In FIG. 3D a cog of the wheel is shown in near contact with the edge 28 of a second step. Continued rotation of the wheel will cause the lifting over the second step, as previously explained in connection with FIG. 3C.

FIG. 5 schematically illustrates the progression of a simplified vehicle, equipped with the wheels of the present invention, in a stair climbing sequence. The vehicle 30 illustrated in FIG. 5 may be equipped with a single front wheel 10a while laterally spaced wheels may be located at an intermediate section (10b, 10c) and the rear of the vehicle (10d, 10e). As will be appreciated from viewing FIG. 5, each of the wheels is free to slip until aligned cogs on each wheel engage an edge of a confronted step, resulting in wheel torque lifting the wheel and pivoting on an engaged cog. As will be seen from FIGS. 3B, 3C, 3D and 5, the foam annulus of the wheel yields when engaging the confronting edge of a step thereby exposing the cogs. After a cog has engaged the leading edge of a step, the horizontal surface of the step bears the pivoting forces of the cog.

FIGS. 4A–4F illustrate a variety of cog profiles. Different types of terrain and obstacles may require the utilization of certain cog profiles over the others.

In FIG. 4A a general purpose triangular profile is illustrated with a rounded tip. In FIG. 4B the cog profile is characterized by parallel sides and a square end which may be more effective at preventing backslide. This latter profile is modified in FIG. 4C wherein a profile, having a rounded end and parallel sides, is illustrated. FIG. 4D indicates a cog profile having a square end and generally resembling a truncated right triangle. The hypotenuse edge of the cog decreases the mass thereof and this may result in a weight reduction for a vehicle utilizing a number of wheels having this cog configuration.

In the event gripping is desirable, the profile of the cogs may evidence fixed spurs, as indicated in FIG. 4E. A flexible design is shown in FIG. 4F, wherein a remotely controlled spike may be retracted or extended, the latter being desirable when a surface traversed is to be gripped strongly.

A further embodiment of the invention is seen in FIG. 2 to include a remote control inflator/deflator 34 which communicates with an inflatable/deflatable tube 32 mounted radially inwardly from the elastomeric annulus 22. The inflator 34 would be conveniently mounted on the wheel, along with a self-contained air supply. The presence of such a remote control device would enable the deflation of the wheels to be controlled to compensate for variations in wheel loading. Individual remote control devices would permit individual wheels to be controlled Also, in the event the terrain was such that cleat action is desirable, the tube 32 may be deflated, thereby exposing the cogs as a vehicle traverses terrain.

It should be stressed that, although the present invention has been discussed in terms of step climbing, the device also has advantages in negotiating other positive obstacles such as rocks and logs, which cause local deformation of the elastomeric annulus 22.

It should be understood that the invention is not limited in number and/or spacing of cogs to that shown in FIGS. 1, 3A through 3D and 5. The optimum cog spacing around a wheel depends on the specific wheel size and the nature of expected obstacles.

It should also be understood that the invention is not limited to the exact details of construction shown and described herein for obvious modifications will occur to persons skilled in the art.

I claim:

1. A wheel adapted for overcoming obstacles and comprising:
   a hub;
   a foam annulus means circumferentially mounted to the hub for normally rolling over a contacted surface and yielding in areas encountered by obstacles; and
   cog means coaxially located on both sides of the annulus means and normally extending less radially outwardly than the annulus means for engaging the obstacle and rolling the wheel thereover.

2. The structure set forth in claim 1 wherein the cog means comprises first and second axially spaced, parallel sprocket means connected to the hub for receiving the annulus therebetween.

3. The structure set forth in claim 1 together with a selectively inflatable tube located radially inwardly of the annulus means.

* * * * *